United States Patent

Johansen et al.

Patent Number: 6,157,667
Date of Patent: Dec. 5, 2000

[54] METHOD AND CALCINING FURNACE FOR ELECTRIC CALCINING OF CARBONACEOUS MATERIAL

[75] Inventors: Johan Johansen; Arnfinn Vatland, both of Kristiansand, Norway

[73] Assignee: Elkem ASA, Norway

[21] Appl. No.: 09/402,423

[22] PCT Filed: Apr. 1, 1998

[86] PCT No.: PCT/NO98/00100

§ 371 Date: Oct. 5, 1999

§ 102(e) Date: Oct. 5, 1999

[87] PCT Pub. No.: WO98/46954

PCT Pub. Date: Oct. 22, 1998

[30] Foreign Application Priority Data

Apr. 14, 1997 [NO] Norway ................................ 971696

[51] Int. Cl.[7] .................................................. F27D 3/00
[52] U.S. Cl. ........................... 373/115; 373/79; 373/111
[58] Field of Search ............................... 373/62, 63, 66, 373/78, 79, 109, 111, 115, 122, 123; 423/414, 445, 461; 432/242, 241

[56] References Cited

U.S. PATENT DOCUMENTS

| | | | |
|---|---|---|---|
| 4,025,610 | 5/1977 | Suzuki et al. | 423/461 |
| 4,678,434 | 7/1987 | Dahl et al. | 432/242 |
| 5,317,592 | 5/1994 | Van Staden | 373/109 |

*Primary Examiner*—Tu Ba Hoang
*Attorney, Agent, or Firm*—Bierman, Muserlian and Lucas

[57] ABSTRACT

An electric furnace and method thereof for electric calcining of carbonaceous material for the production of graphite or graphite-containing material, wherein the carbonaceous material is supplied to the top of a vertically arranged furnace having a cylindrical cross section. The furnace is equipped with one top electrode and one bottom electrode supplied with electric current for heating of the carbonaceous material. The calcined carbonaceous material is discharged at the bottom of the furnace in one stream in the center of the furnace and one stream near the periphery of the furnace.

6 Claims, 2 Drawing Sheets

METHOD AND CALCINING FURNACE FOR ELECTRIC CALCINING OF CARBONACEOUS MATERIAL

FIELD OF INVENTION

The present invention relates to a method for calcining carbonaceous materials in electric calcining furnaces and to an electric calcining furnace for calcining of carbonaceous materials.

BACKGROUND ART

Electric calcining of carbonaceous material such as anthracite, pitch coke, metallurgical coke and petrol coke is carried out by conducting electric current through a bed of the carbonaceous materials which are to be calcined. Electric current is supplied to the calcining furnace through one carbon electrode arranged in the top of the furnace and one carbon electrode arranged in the bottom of the furnace. The calcining furnace is in the form of a vertical shaft where the material which shall be calcined, is supplied at the top of the furnace. The flow of material through the furnace is controlled by the rate of discharge of calcined material at the bottom of the furnace.

During the calcining process the carbonaceous material is heated and upon heating any moisture will be removed from the carbonaceous material. Upon further heating volatile matters is released from the carbonaceous material. Depending on the final temperature to which the carbonaceous material is being heated, a part of the carbonaceous material will be transformed to graphite.

Electric calcining of carbonaceous material is characterized in that the temperature between the electrodes in the center of the furnace is very high, above 2500° C., while the temperature in the periphery of the furnace is substantially lower, between 800 and 1200° C. The finished calcined product removed from the lower end of the furnace has for this reason been subjected to an uneven heat treatment during the calcining process. The very high temperatures in the center of the furnace results in that ash components in the carbonaceous materials are volatalized and transferred radially outwards where they condense on colder material or on the inner furnace wall lining. In order to be able to run the calcining process in a continuous and stable way, the mass balance in the furnace has to be maintained. This means the ash components in the carbonaceous material supplied at the top of the furnace, must be withdrawn together with the calcined material at the bottom of the furnace.

In conventional electric calcining furnaces withdrawal of calcined material at the bottom of the furnace is done over the whole furnace cross-section, whereby a mixture of material which has been heated within a temperature range between 800° C. to above 2500° C., is obtained. This gives an inhomogeneous calcined material with respect to ash content, content of graphite and electrical conductivity.

DISCLOSURE OF INVENTION

By the present invention one has now arrived at a method for electric calcining of carbonaceous materials such as anthracite and petrol coke whereby calcined material can be produced in more than one quality depending on the calcining temperature. It has further been developed an electric calcining furnace for carrying out the method.

Thus, according to a first embodiment, the present invention relates to a method for electric calcining of carbonaceous material for the production of graphite or graphite-containing material where carbonaceous materials are continuously or substantially continuously supplied to the top of a substantially vertically arranged furnace having a cylindrical cross-section, said furnace being equipped with one top electrode and one bottom electrode and having means for supplying electric current to the electrodes for heating of the carbonaceous materials and where calcined carbonaceous material is continuously or substantially continuously discharged at the bottom of the furnace, said method being characterized in that the calcined material at the bottom of the furnace is discharged in one stream containing material calcined in the center of the furnace and one stream containing material calcined near the periphery of the furnace.

According to a preferred embodiment the carbonaceous materials are supplied to the top of the calcining furnace in two separate streams, where one stream is supplied about the top electrode, while the other stream is supplied about the periphery of the furnace.

According to another embodiment at least a part of the carbonaceous material supplied about the periphery of the furnace is recirculated calcined material which has been discharged at the periphery of the bottom of the furnace.

As carbonaceous material supplied to the furnace it is preferably supplied anthracite, petrol coke, pitch coke and metallurgical coke.

The present invention further relates to an electric calcining furnaces comprising a substantially vertically arranged furnace having a top electrode, a bottom electrode, means for supplying electric operating current to the electrodes, an inlet opening at the top of the furnace for supplying carbonaceous material and means at the bottom of the furnace for discharging calcined material, said furnace being characterized in that a cylinder-shaped ring having an open upper end and having a diameter which is greater than the diameter of the bottom electrode and an outer diameter smaller than the inner diameter of the furnace, is arranged centrally at the bottom of the furnace and that separate discharging means are arranged for calcined material flowing through the cylinder-shaped ring and for calcined material flowing between the furnace periphery and the outside of the cylinder-shaped ring.

According to one embodiment, the upper end of the cylinder-shaped ring is at a lower level than the top of the bottom electrode.

According to another preferred embodiment a ring-shaped shaft is arranged at the upper end of the furnace for supply of material to be calcined, where the radial opening of the ring-shaped shaft is substantially equal to the distance between the inner furnace wall and the cylinder-shaped ring arranged in the lower end of the furnace.

By the method and the calcining furnace according to the present invention, two separate streams of calcined carbonaceous material are discharged from the furnace. One central stream of calcined material which is discharged at the bottom of the cylinder-shaped ring and a periphery stream of calcined material which is discharged in the annulus between the periphery of the furnace and the outside of the cylinder shaped ring.

The central stream of calcined material discharged through the cylinder-shaped ring has during its flow through the furnace been heated to a very high temperature where ash components have been volatilized and conducted to the colder zone of the periphery of the furnace. The peripheral stream of calcined material discharged through the cylinder-shaped ring will thereby be very clean and will, in dependency of retention time in the furnace, show a high degree of graphitization. The calcined material discharged through the cylinder-shaped ring will thus have a very high quality and can be used as carbonizing material, material for the production of carbon cathodes, carbon electrodes, electrode paste for self-baking electrodes, machine parts and as graphite additive for oils, lubricants etc.

The peripheral stream of calcined material discharged in the annulus between the furnace periphery and the outside of the cylinder-shaped ring will, during its flow through the furnace, be heated to a substantial lower temperature in the range between 700° C. and 2300° C. This material will have a low degree of graphitization and will have a high content of ash components, as ash component volatalized from the material in the central part of the furnace will condence in the peripheral part of the furnace. The calcined material in the peripheral stream discharged from the furnace will thus normally have a lower quality and can be used as carbon material in electrode paste for self-baking electrode, prebaked electrodes, carbon anodes etc.

It has surprisingly been found that by the method and the calcining furnace according to the present invention a substantially plug-formed movement of the carbonaceous material in the central part of the furnace and in the peripheral part of the furnace is obtained.

DETAILED DESCRIPTION OF PREFERRED EMBODIMENTS

Figure 1:
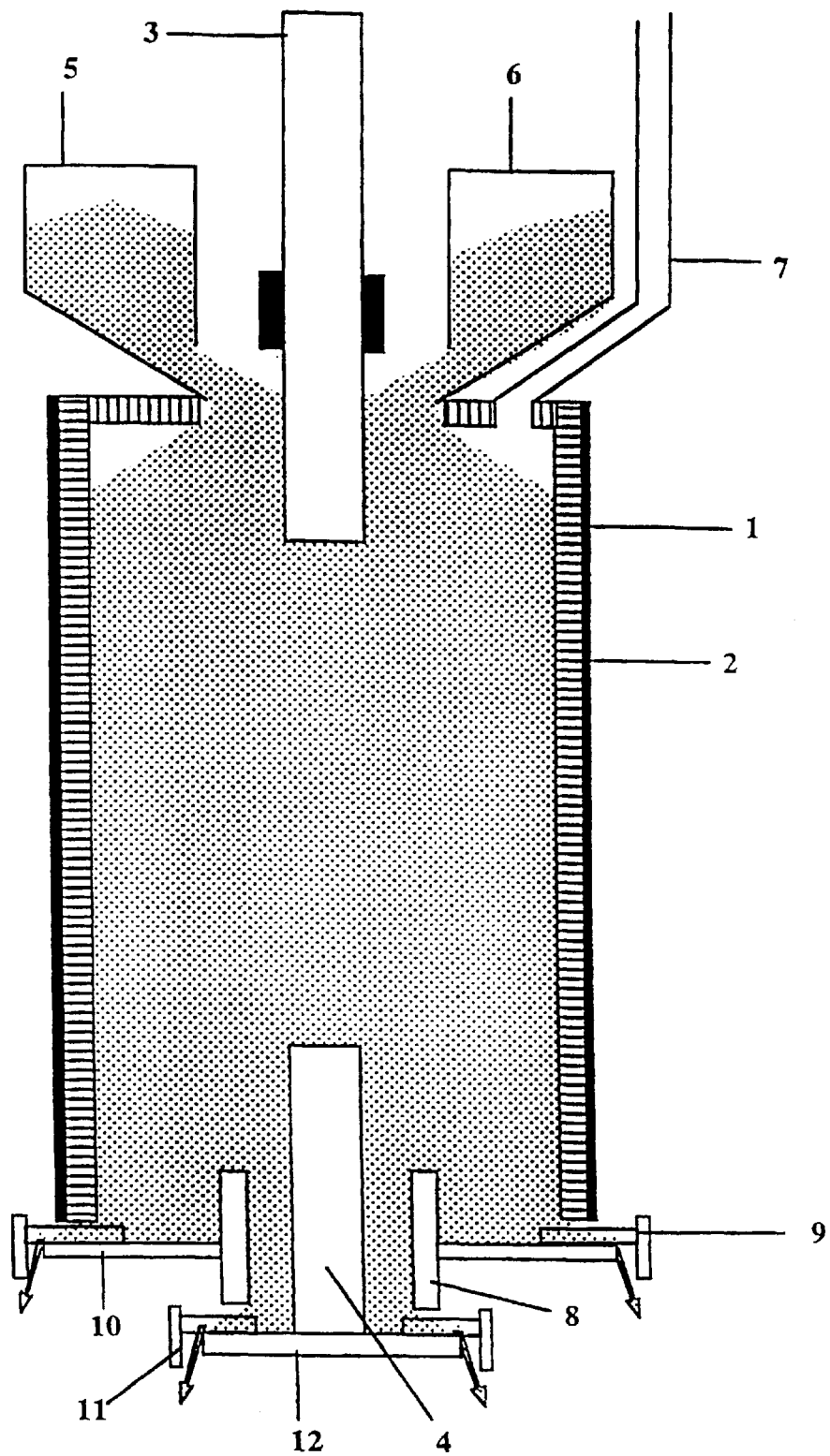
FIG. 1 is a vertical view through a first embodiment of an electric calcining furnace according to the present invention, and where

In FIG. 1 there is shown an electric calcining furnace comprising a cylindrical shaped furnace wall 1 having an inner refractory lining 2. The furnace is equipped with one top electrode 3 and one bottom electrode 4. The furnace is further equipped with conventional means (not shown) for supply of electrical operating current to the electrodes 3, 4. In the upper part of the furnace, it is arranged two shafts 5, 6 for supplying carbonaceous materials to the furnace. In the upper part of the furnace there is further arranged an off-gas channel 7. According to the present invention it is in the lower part of the furnace arranged a cylinder-shaped ring 8 having an inner diameter greater than the diameter of the bottom electrode 4 and having an outer diameter less than the inner diameter of the calcining furnace. The ring 8 is open in its upper end and is centrally arranged about the bottom electrode 4. The upper end of the ring 8 can extend to a level above the top of the bottom electrode 4, but it is preferred that the upper end of the ring 8 extends to a level below the top of the bottom electrode 4.

A first discharging means 9 is arranged at the bottom 10 of the calcining furnace for continuous or substantially continuous discharging of a peripheral stream of calcined material from the annulus between the outside of the ring 8 and the inside of the calcining furnace. The first discharging means 9 is preferably a conventional rotatable scraper which is rotated horizontally on the bottom 10 of the calcining furnace. A second discharging means 11 is arranged on the bottom 12 of the calcining furnace between the bottom electrode 4 and the ring 8 for discharging a central stream of calcined material from the annulus between the bottom electrode 4 and the ring 8. The discharged peripheral stream and the discharged central stream are collected separately.

During operation of the calcining furnace the supply shafts 5, 6 is kept substantially filled with uncalcined material, while the material flow through the furnace is regulated by means of the discharging means 9 and 11. The discharging rate for the discharging means 9 and 11 is regulated in such a way that a substantially plug-formed movement of carbonaceous material downwards through the furnace is obtained. It has surprisingly been found that by the method and the furnace according to the present invention substantially no mixing takes place between material which has been calcined at a low temperature in the periphery of the furnace and material which has been calcined at a high temperature in the center of the furnace.

The calcined material which is discharged through the discharging means 11 will thus have a high quality as to low ash content, high electric conductivity and a high degree of graphitization. By using a ring 8 having a smaller diameter than the ring shown in FIG. 1, it will be obtained a smaller center stream of calcined material, but with an improved quality. By using a ring 8 having a greater diameter than shown in FIG. 1 it will be obtained an increased center stream, but of a somewhat lower quality. The method and the calcining furnace according to the present invention are thus very flexible as to obtain a preset quality of the calcined material discharged from the center of the furnace.

Figure 2:
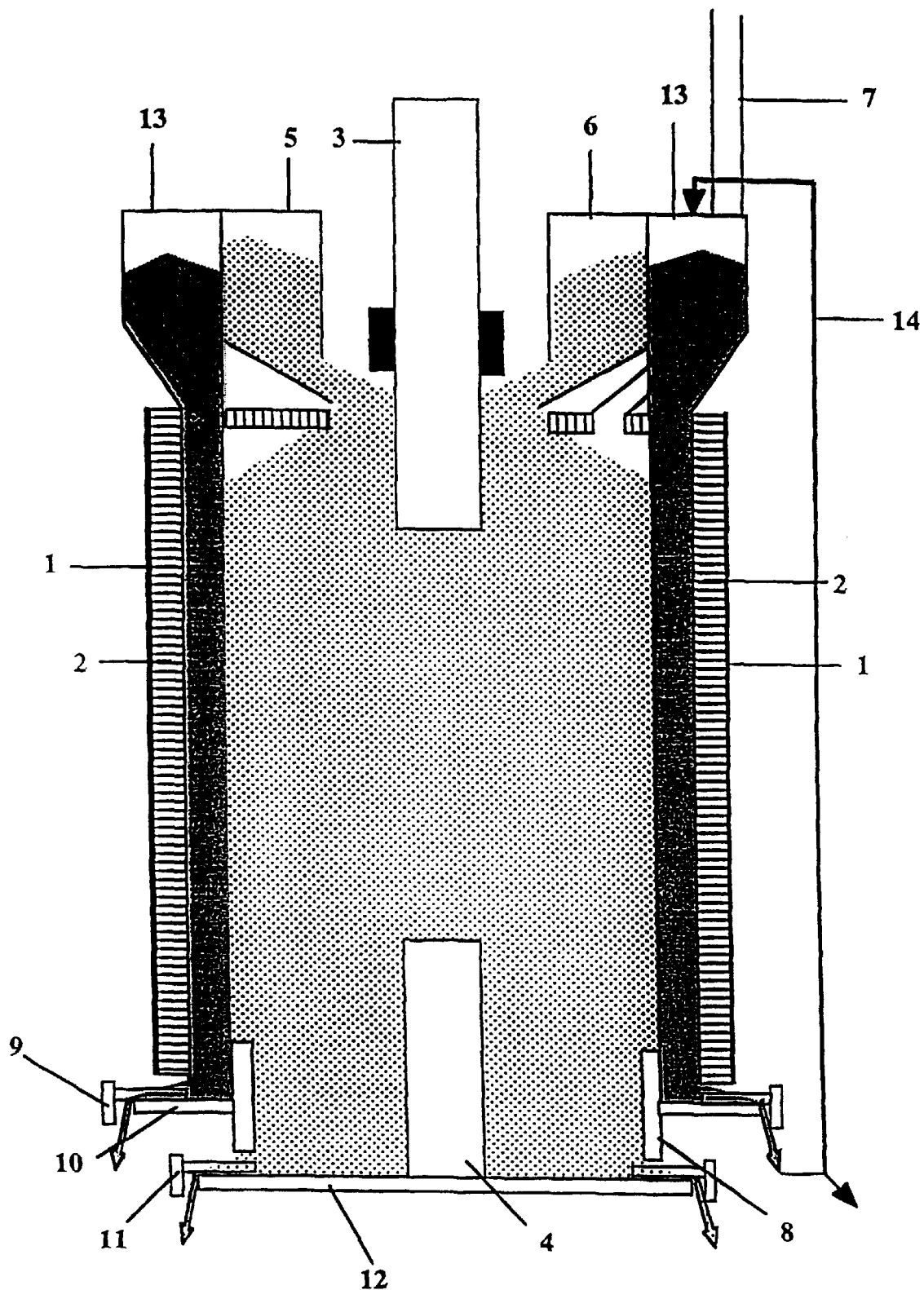
FIG. 2 is a vertical view through a second embodiment of an electric calcining furnace according to the present invention.

In FIG. 2 there is shown a second embodiment of the calcining furnace. The calcining furnace shown in FIG. 2 differs from the calcining furnace shown in FIG. 1 in that it in addition to the supply shafts 5 and 6 is equipped with an additional ring-shaped supply shaft 13 for supply of carbonaceous material along the periphery of the furnace.

During operation of the furnace shown in FIG. 2 non-calcined carbonaceous material is supplied through the supply shafts 5, 6, while a mixture of non-calcined carbonaceous material and recirculated calcined material from the periphery stream discharged by the discharging means 9 is supplied through the shaft 13 as shown at 14.

What is claimed is:

1. Method for electric calcining of carbonaceous material for the production of graphite or graphite-containing material where carbonaceous materials are continuously or substantially continuously supplied to the top of a substantially vertically arranged furnace having a cylindrical cross-section, said furnace being equipped with one top electrode and one bottom electrode and having means for supplying electric current to the electrode for heating of the carbonaceous materials and where calcined carbonaceous material is continuously or substantially continuously discharged at the bottom of the furnace, characterized in that the calcined material at the bottom of the furnace is discharged in one stream containing material calcined in the center of the furnace and one stream containing material calcined near the periphery of the furnace.

2. Method according to claim 1, characterized in that the carbonaceous materials are supplied to the top of the calcining furnace in two separate streams, where one stream is supplied about the top electrode, while the other stream is supplied about the periphery of the furnace.

3. Method according to claim 2, characterized in that at least a part of the carbonaceous material supplied about the periphery of the furnace is recirculated calcined material which has been discharged at the periphery of the bottom of the furnace.

4. An electric calcining furnaces comprising a substantially vertically arranged furnace having a top electrode (3), a bottom electrode (4), means for supplying electric operating current to the electrodes, an inlet opening (5,6) at the top of the furnace for supplying carbonaceous material and means (9, 11) at the bottom of the furnace for discharging calcined material, characterized in that a cylinder-shaped ring (8) having an open upper end and having an inner diameter which is greater than the diameter of the bottom electrode (4) and an outer diameter smaller than the inner diameter of the furnace, is arranged centrally at the bottom of the furnace and that separate discharging means (9, 11) are arranged for calcined material flowing through the cylinder-shaped ring (8) and for calcined material flowing between the furnace periphery and the outside of the cylinder-shaped ring (8).

5. Furnace according to claim 4, characterized in that the upper end of the cylinder-shaped ring (8) is at a lower level than the top of the bottom electrode (4).

6. Furnace according to claim 4, characterized in that a ring-shaped shaft (13) is arranged at the upper end of the furnace for supply of material to be calcined, said ring-shaped shaft (13) having a radial opening which is substantially equal the distance between the inner furnace wall and the cylinder-shaped ring (8) arranged in the lower end of the furnace.

* * * * *